United States Patent [19]

Thomas

[11] Patent Number: 5,282,554
[45] Date of Patent: Feb. 1, 1994

[54] BICYCLE COOLER AND MOUNTING APPARATUS

[76] Inventor: Jan B. Thomas, 22 Deallyon #8, Hilton Head, S.C. 29928

[21] Appl. No.: 923,059

[22] Filed: Jul. 31, 1992

[51] Int. Cl.$^5$ ............................................. B62J 7/06
[52] U.S. Cl. .................................... 224/36; 224/30 A
[58] Field of Search ................... 224/30 R, 30 A, 31, 224/32 R, 35, 36, 38, 39, 40, 41; 248/223.4, 224.1, 224.2, 311.2

[56] References Cited

U.S. PATENT DOCUMENTS

| | | | |
|---|---|---|---|
| 613,226 | 11/1898 | Adams | 224/30 A |
| 637,733 | 11/1899 | Hall | 224/30 A |
| 767,823 | 8/1904 | Lederman | 212/105 |
| 3,613,970 | 10/1971 | Humlong | 224/36 |
| 3,955,729 | 5/1976 | Montgomery | 224/36 |
| 4,056,219 | 11/1977 | Hine, Jr. | 224/36 |
| 4,260,086 | 4/1981 | Hine, Jr. et al. | 224/36 |
| 4,315,583 | 2/1982 | Hine, Jr. | 224/41 |
| 4,366,922 | 1/1983 | Levine et al. | 248/224.2 |
| 4,415,105 | 11/1983 | Jackson | 224/41 |
| 4,440,332 | 4/1984 | Kullen | 224/36 |
| 4,542,839 | 9/1985 | Levine et al. | 224/36 |
| 4,638,933 | 1/1987 | Boufford | 224/41 |
| 4,730,758 | 3/1988 | McMurtrey | 224/36 |
| 4,981,243 | 1/1991 | Rogowski | 224/30 A |
| 5,024,359 | 6/1991 | Thomas | 224/36 |
| 5,105,958 | 4/1992 | Patton | 224/274 |

Primary Examiner—Renee S. Luebke
Attorney, Agent, or Firm—McAndrews, Held & Malloy, Ltd.

[57] ABSTRACT

An insulated bicycle cooler adapted for detachable mounting to a mounting bracket. The mounting bracket is adapted for attachment to the head and handlebar intersection of a conventional bicycle.

31 Claims, 3 Drawing Sheets

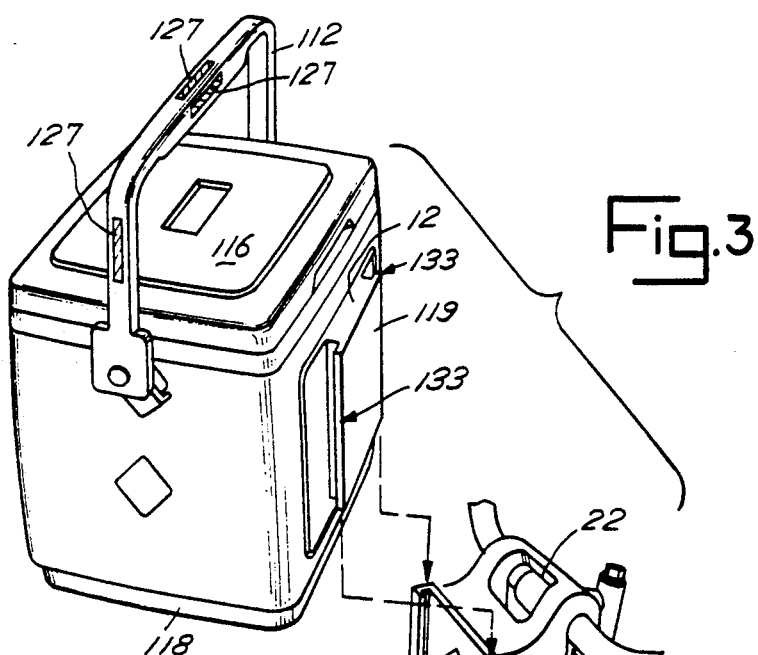
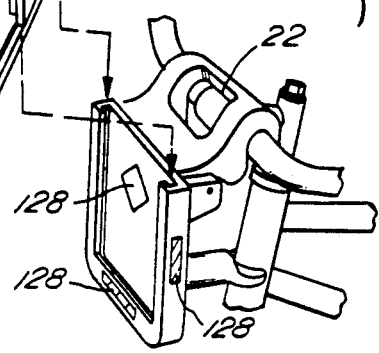
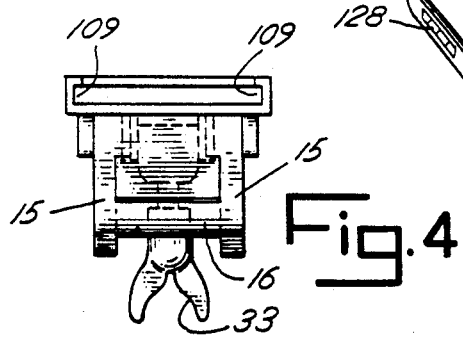
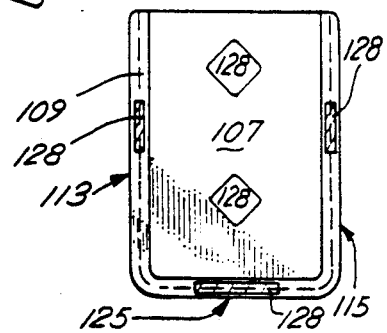
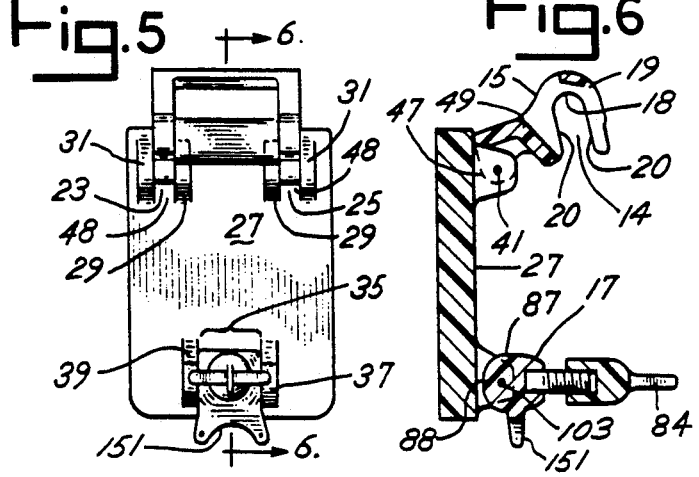
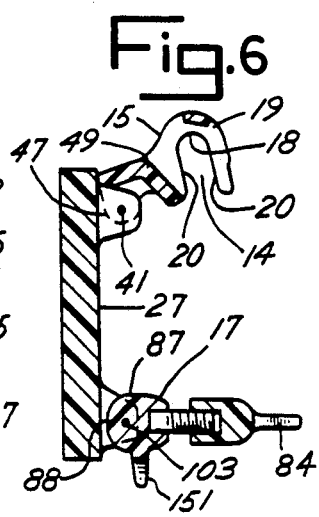
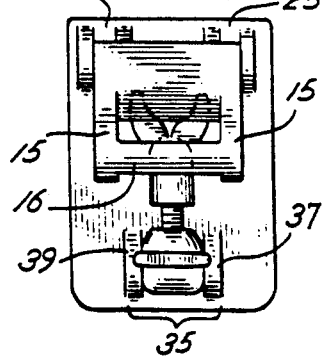

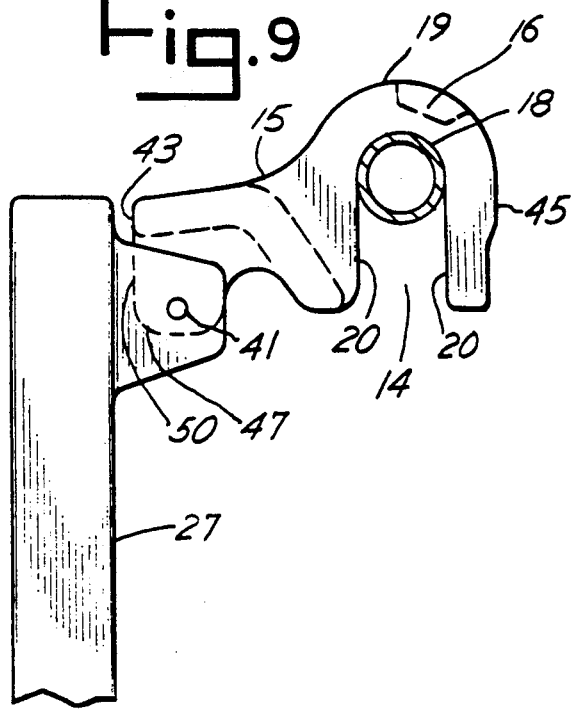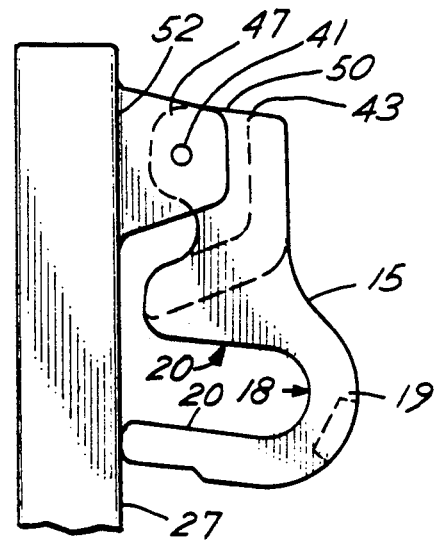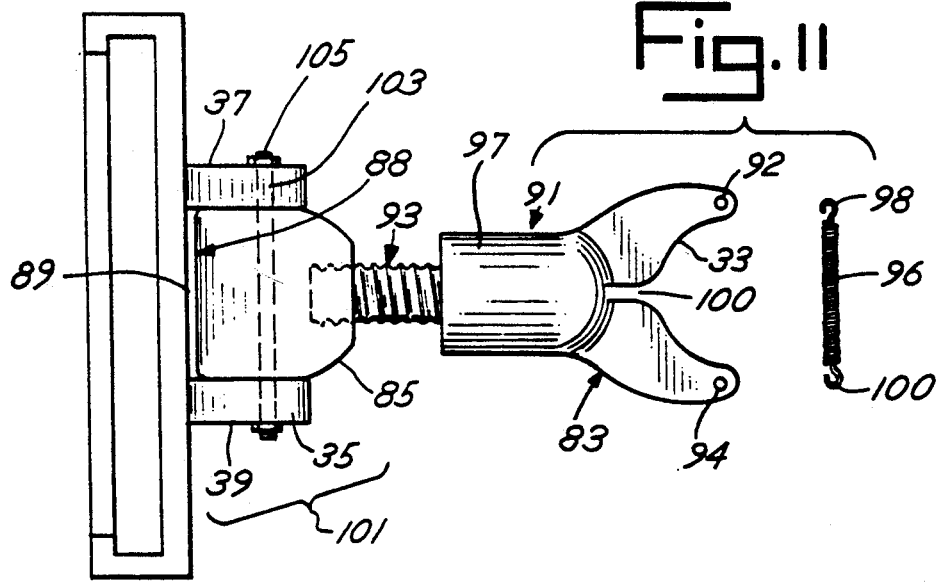

//5,282,554

BICYCLE COOLER AND MOUNTING APPARATUS

BACKGROUND OF THE INVENTION

This invention relates to a mounting bracket for detachable mounting to the head and handlebar intersection of a conventional bicycle in combination with a container adapted for mounting to the bracket, and more particularly, relates to an insulated cooler having a connective attachment element adapted for mounting to the mounting bracket.

There are numerous bicycle packs, pack supports, baskets and other assemblies known in the prior art. These devices generally utilize straps and clips for attaching baskets or light weight packs to a bicycle. The object of these prior packs and pack supports is to provide a light weight, usually softsided or wire frame, container for transporting small articles normally used for bicycle maintenance or to carry amenities such as water, extra clothing, small amounts of food or other amenities.

However, occasions arise such as picnic trips, etc., where it is desired to carry much larger items by bicycle. It would be highly desirable to provide for a larger heavy duty container, such as an insulated cooler or similarly large container, having a simple design and which could be quickly and conveniently attached to a bicycle.

It is therefore an object of the present invention to provide a heavy duty container and mounting bracket combination which easily attaches to and is removed from a bicycle.

It is a further object of the present invention to provide an insulated cooler adapted for mounting to a mounting bracket for attachment to a bicycle.

It is another object of the invention to provide a cooler mounting bracket combination wherein the cooler is provided with reflective material attached to one or more parts of the cooler and to one or more parts of the mounting bracket.

SUMMARY OF THE INVENTION

These and other objects are achieved in a container and mounting bracket combination for detachable mounting to the head and handlebar intersection of a bicycle frame. The mounting bracket, is securable to the bicycle handlebars for removably receiving a container in a secure and stable position.

The back surface of the container includes a mounting platform adapted for connection to the mounting bracket.

BRIEF DESCRIPTION OF THE DRAWINGS

FIG. 3 illustrates a perspective view of the back side of the cooler and the front side of the mounting bracket.

FIG. 4 illustrates a top end view of the mounting bracket.

FIG. 5 illustrates the back side of the mounting bracket.

FIG. 6 illustrates a side view of the mounting bracket.

FIG. 7 illustrates the front side of the mounting bracket.

FIG. 8 illustrates the back side of the mounting bracket showing arm supports folded downwardly into their storage position, and the foot support folded upwardly.

FIG. 9 illustrates a side view of the support arms.

FIG. 10 illustrates a side view of the support arms folded downwardly in a storage position.

FIG. 11 is a top view of the foot support member in an extended position.

DETAILED DESCRIPTION OF THE INVENTION

Figure 1:
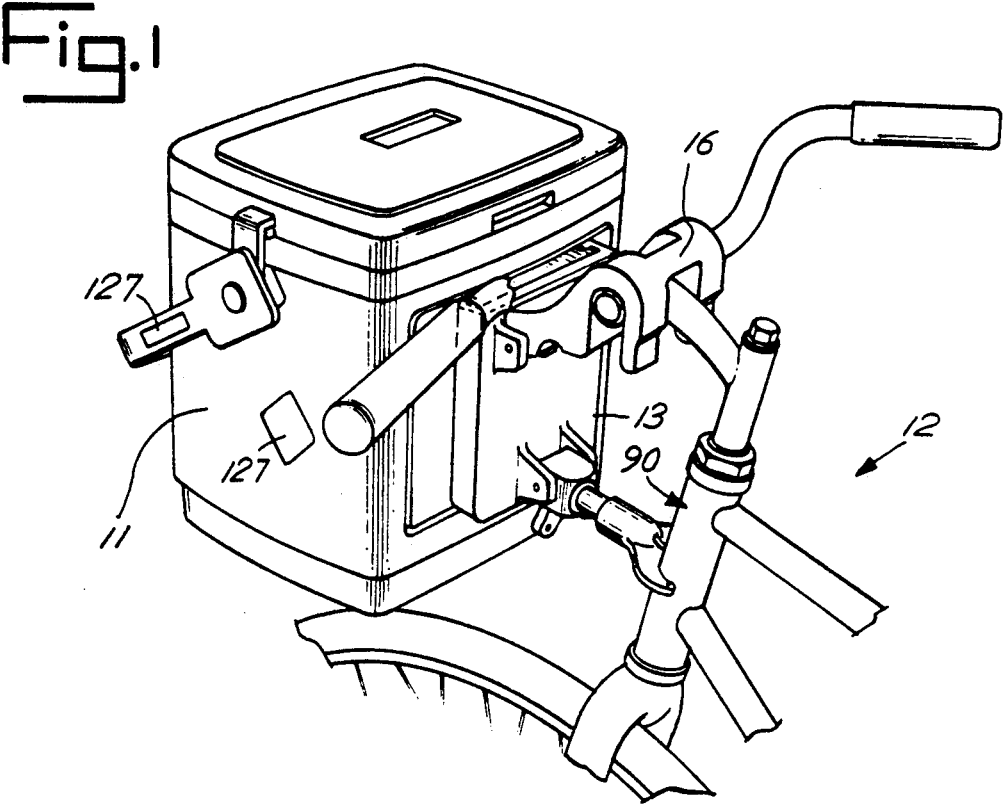
FIG. 1 illustrates the bicycle cooler and mounting bracket mounted on the handlebars of a bicycle.

FIG. 1, generally illustrates a cooler 11 and a mounting bracket 13 mounted on a bicycle 12. As illustrated in FIGS. 2-10, the mounting bracket 13 comprises a pair of arm supports 15 and an adjustable foot support 17. Arm supports 15 and foot support 17 serve to support mounting bracket 13 on to the bicycle.

Each arm support 15 comprises an arcuate arm extension 19. The arcuate arm extensions 19 cooperate with the handlebars of the bicycle to firmly support the mounting bracket and the cooler in a fixed relationship to the bicycle. As shown in FIGS. 6, 9 and 10 each arm extension 19 includes a slot opening 14 for receiving the cylindrical shaped handlebars. Each slot opening 14 terminates in a circular arc surface 18 for mating with the handlebars. The weight of the cooler 11 and bracket 13 maintains the handlebars at the terminal end of slot 14 against arc surface 18. Slot 14 is elongated away from the arc surface 18, providing parallel elongated surfaces 20 spaced apart slightly larger than the diameter of conventional handlebars. Elongated surface 20 maintains the handlebars within the slots 14 during bumpy movement of the bicycle over rough terrain or the like.

Arcuate arm extensions 19 are connected to one another by an arm extension support member 16. Arm extension support member 16 is located above and spaced from the arc surface 18 to avoid contact with the handlebar coupling 22 (FIG. 3) of the bicycle. The support member 16 may be molded integrally with the arm extensions 19, as shown in FIG. 6.

Arm supports 15 are pivotally attached to a pair of molded brackets 23,25 which are molded integral with the backside 27 of the mounting bracket. Brackets 23,25 are symmetrically positioned on the bracket backside and spaced apart a distance sufficient to permit arm extensions 19 to receive a conventional pair of bicycle handle bars within slot openings 14. Each bracket 23, 25 includes a pair of upstanding bearing members 29,31 which are spaced apart a distance sufficient to permit an arm support 15 to pivot between bearing members 29,31.

Adjustable foot support 17 is positioned below the arm supports 15 and along the vertical center line of the mounting bracket 13. Foot support 17 includes a curved surface 33 (FIGS. 4 and 11) which slidingly mates with the curved head of the bicycle (as shown in FIG. 1) for providing a brace support to stabilize the mounting bracket during bicycle movement. This three point attachment provides a fixed gripping at two points on the handlebars and a rotating support at one point on the head allowing the handlebars to be turned during bicycle operation.

Foot support 17 is pivotally attached to a molded bracket 35 which is formed integral with backside 27 of the mounting bracket. Bracket 35 includes a pair of upstanding members 37,39 which are spaced a distance sufficient to permit foot support 17 to pivot between members 37,39 (FIGS. 5, 8 and 11).

Referring to FIGS. 2, 6, 9 and 10 each of the bearing members 29, 31 define a pivot axis 41 about which arm supports 15 pivot. A conventional structure for permitting the pivoting of arm supports 15 relative to the container may be used. For example, a bolt or pin fastener may be used; axle pins (not shown) molded integral to arm support 15 may fit within holes formed in bearing members 29,31, etc.

Figure 2:
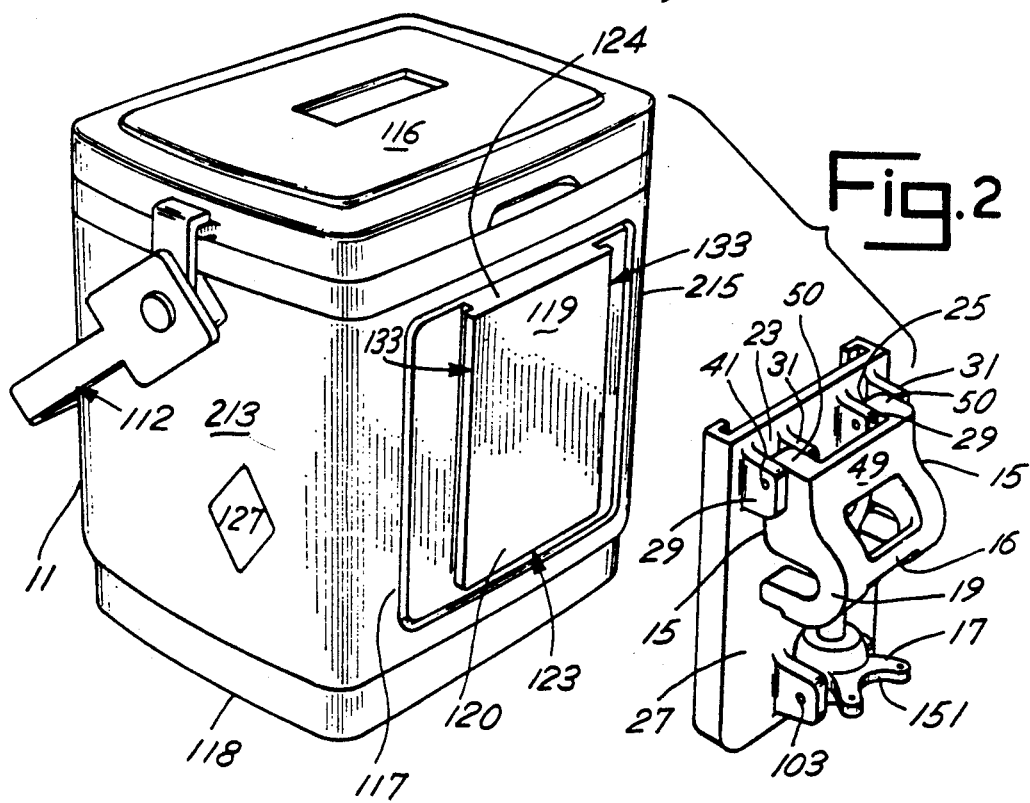
FIG. 2 illustrates the back side of the cooler disengaged from the mounting bracket, and a back view of the mounting bracket.

Each arm support 15 has an inner end 43 and an outer end 45 (FIGS. 9 and 10). Inner end 43 is provided with a rounded surface 47 (FIGS. 6, 9 and 10) which provides a smooth curved surface allowing arm extension 19 to be rotated downwardly and against backside 27 (as shown in FIGS. 2 and 8). As will suggest itself, the backside 27 of the mounting bracket may be molded in the area 48 (FIG. 5) between brackets 23,25 with a particular configuration which cooperates with the curved surface 47 to permit downward rotation of arm extension 19.

Alternatively, area 48 may be flat and flush with the majority of the surface plane of the backside 27, and curved surface 47 is configured to cooperate with flat surface 48 to permit the arm rotation.

In addition, inner end 43 of each arm support 15 includes a flat surface 50 (FIGS. 2, 9 and 10) which serves as a stop to limit the extent of upward rotation of arm supports 15 and extensions 19. Flat surface 50 abuts a flat surface 52 (FIG. 10) formed on the backside 27 of the mounting bracket in the area adjacent brackets 23,25.

A second support member 49 connects each arm support 15 at inner end 43. As shown in FIG. 6, support member 49 has an obtuse angular cross-section.

Referring to FIG. 11, adjustable foot support 17 includes a distal end 83 carrying curved surface 33 and a proximal end 85 which is pivoted between upstanding members 37,39. Proximal end 85 is shaped with a curved surface 87, as shown in FIG. 6, for permitting foot support 17 to pivot vertically upwardly against the backside 27 of the mounting bracket as shown in FIGS. 2 and 8. A flat surface 88 (FIG. 6) is also carried by proximal end 85 for making contact with a corresponding flat surface 89 carried on backside 27 between upstanding members 37,39 in order to stop and limit downward rotation of foot support 17 to its position shown in FIG. 6.

Referring again to FIG. 11, distal end 83 includes a head brace 91 designed for engaging a bicycle head 90 (FIG. 1). Curved surface 33 is of a size for making contact with a conventional cylindrical bicycle head. A slot 100 is formed in the center area of curved surface 33 for receiving the brake cable of the bicycle if the bicycle has hand brakes.

Head brace 91 includes a coupling member 97 having a threaded interior cylindrical surface for mating with a threaded cylindrical extension 93.

A base member 101 forms the proximal end of foot support 17 and includes a pivot hole 103 for receiving a pivot pin 105 which passes through base member 101 and upstanding members 37,39. The base member also includes the threaded cylindrical extension 93.

Foot support 17 is adjustable in length via the threaded coupling member 97. Threaded coupling member 97 is manually rotated relative to cylindrical extension 93 to extend the adjustable foot for forcing head brace 91 against the bicycle head and spacing the cooler relative to the bicycle head.

In addition, head brace 91 may include a pair of holes 92,94 (FIG. 11) formed on opposite sides of curved surface 33. A security strap 96 includes a pair of fastening hooks 98,100 for fastening into holes 92,94. Strap 96 may be formed from an elastic material or spring material, and fits around the back of the head of the bicycle for biasing head brace 91 against the front of the head.

The proximal end also includes a second head brace 151 of the same general configuration as head brace 91 (FIGS. 2, 5 and 6). The head brace 151 extends from base member 101 at about a 90° angle from the extension direction of head brace 91. The location of the head brace 151 on the proximal end is such that when head brace 91 engages the bicycle head, head brace 151 extends downwardly as shown in FIG. 1. When the adjustable foot support is pivoted upwardly against the back side of the mounting bracket, the proximal head brace is positioned so as to engage the bicycle head as shown in FIG. 2. The second head brace is also equipped with a groove 84 (FIG. 6) to allow passage of a bicycle cable and with holes 102, 104 to allow the use of the retention straps 96.

The distance between the bicycle head 90 and the mounting bracket 13 is shorter when using head brace 151 than that possibly obtainable when using head brace 91. Thus, a shorter spacing head brace is provided through brace 151.

Referring now to FIG. 7, the front side 107 of the mounting bracket 13 supports a mounting structure comprising a grooved retention slot 109 disposed along the two side edges 113,115 and bottom edge 117 of the mounting bracket. Grooved retention slot 109 serves as a mounting structure for detachable engagement of the mounting bracket 13 with the cooler 11. As shown in FIG. 4 slot 109 is formed of a C-shaped channel on each side 113, 115 of the flat front side 107. The C-shape channel is continuous and wraps around the bottom 125 of front side 107. The top side of front side 107 is open for permitting a mounting member 120 (FIG. 2) to slide within the C-shaped channel.

Mounting bracket 13 may be constructed from a wide variety of suitably rigid plastics by molding processes widely known in the art. In addition, it is also contemplated that the mounting bracket may be made from other materials such as wood or metal.

Referring now to FIG. 2, the bicycle cooler 11 comprises an insulated cooler of the type that is widely known and commonly used to keep food, beverages or other items cold or warm. Other types of containers may also be used. Cooler 11 includes a front member 111, two side members 213, 215, a back member 117, a bottom member 118, forming a rectangular box-shaped cooler. A removable lid 116 rests atop the cooler in a conventional fashion. A handle 112, is pivotally secured to the cooler permitting the cooler to be manually carried upon release of the cooler from mounting bracket 13. The cooler is adapted for mounting onto the mounting bracket 13 via mounting member 120 which is secured to the back side 117 of the cooler. Mounting member 120 includes a planar extended mounting platform 119 for fitting securely within the retention slot 109. Platform 119 is raised away from the back member 117 via a spacer section 124 formed integral with platform 119. Platform 119 thus has its two side edges and bottom edge over-hanging or protruding so as to form side tabs 133 of a shape so as to fit securely within the retention slots 109 of the mounting bracket 13 (FIG. 2). The mounting member 120 can be integrally molded as part of the back side of the cooler or can be fabricated separately and affixed to the cooler by way of adhesives, screws or other structures, thus adapting the cooler for mounting onto the mounting bracket 13.

The cooler is mounted on the mounting bracket by sliding the side tabs 133 of mounting platform 119 into the retention slot 109 of the mounting bracket. The platform is slid downwardly within slot 109 until the bottom edge 123 (FIG. 2) of platform 119 contacts the bottom edge 125 (FIG. 7) of the slot 109. If desired, the mounting platform 119 may be constructed from any of a variety of surface materials such as Teflon rubber (a polytetrafluorethylene plastic material), textured plastic or other surfaces so as to achieve the appropriate frictional relationship between the cooler and the mounting bracket. As seen, platform 119 is a structural member configured to present engageable surfaces which are slidingly received by C-shaped channel slot 109. This configured structure 119 is both sturdy and sufficiently wide to provide surface area on the back side of the cooler to give stability to the supporting of the cooler by the mounting bracket. As will suggest itself, mounting member 120 may be configured in a form other than a projecting platform. For example, a U-shaped ring member may define tabs 133 which engage slot 109.

In addition, slot 109 is a mounting structure which provides engageable surfaces for receiving the configured structural mounting member 120. As will suggest itself, mounting structure 109 may be configured in a form other than a C-shaped channel slot. The mounting structure 109 provides a member having a configuration which engages the configuration of mounting member 120. For example, the mounting structure 109 and the mounting member 120 may be reversed such that cooler 11 carries a slot 109 and mounting bracket 13 carries a platform 119. In such a case, slot 109 and platform 119 would be inverted by 180° as understood. In addition, the mounting bracket may be equipped with reflectors 128.

In addition, cooler 11 may be equipped with reflectors 127 (FIG. 2) so as to make the cooler visible in conditions of low light or bright light. The reflectors 127 may be in the form of reflective tape, reflective plastic or metal, round or polyhedral reflectors which are attached to the front and sides of the cooler, to the handle of the cooler or may be incorporated as a component of any design or labelling used on the cooler.

The cooler 11 may be fabricated from plastics by molding or other fabrication processes well known in the art.

Other modifications and additions to the present invention not disclosed herein may also be made without departing from the spirit and scope of the invention which is defined by the following claims.

What is claimed is:

1. An insulated cooler and mounting bracket combination for detachable mounting of the cooler to a bicycle frame, comprising:

an insulated cooler having a front surface, a bottom surface, two opposing side surfaces, and a back surface;

a mounting platform secured to said back surface and spaced outwardly therefrom, said mounting platform having a configured structure oriented for defining a vertical plane;

a mounting bracket formed of a body member having (i) a flat planar front side and back side; (ii) a retention slot carried by said body member and disposed relative to said planar front side, (iii) a support structure extending from the back side of said body member and adapted to mount onto handlebars of the bicycle for stable securement of the mounting bracket to the bicycle during movement of the bicycle, said support structure spacing said flat planar front side of said body member outwardly in front of the handlebars and disposing said flat planar front side in a vertical orientation, said retention slot being vertically disposed for vertically receiving said configured structure, whereby said insulated cooler is disengageably mounted to said mounting bracket when said mounting bracket is fixedly secured to the bicycle without removal of said mounting bracket from the bicycle.

2. An insulated cooler and mounting bracket combination according to claim 1 and further comprising reflective means for reflecting light.

3. An insulated cooler and mounting bracket combination according to claim 2 wherein said reflective means comprises plastic reflectors.

4. An insulated cooler and mounting bracket combination according to claim 2 wherein said reflective means comprises reflective tape.

5. An insulated cooler and mounting bracket combination according to claim 2 wherein said reflective means comprises plastic reflective material.

6. An insulated cooler and mounting bracket combination according to claim 2 wherein said reflective means is incorporated as a component of a design used on said insulated cooler.

7. An insulated cooler and mounting bracket combination according to claim 2 wherein said reflective means is mounted to said side surfaces of said cooler.

8. An insulated cooler and mounting bracket combination according to claim 7 wherein said reflective means comprises reflective tape.

9. An insulated cooler and mounting bracket combination according to claim 2 in which said insulated cooler includes a handle; and wherein the reflective means is mounted to said handle of said cooler.

10. An insulated cooler and mounting bracket combination according to claim 9 wherein the reflective means is mounted to said side surfaces and said front surface of said cooler.

11. An insulated cooler and mounting bracket combination for detachable mounting of the cooler to handlebars of a bicycle frame, the handlebars having a cylindrical shape, comprising:

a mounting bracket adapted to mount onto the handlebars of a bicycle for stable securement thereto during movement of the bicycle, said mounting bracket having mounting structure engageable with a configured structure for removeably receiving the configured structure, said mounting bracket including a pair of arms extending outwardly from a backside of said bracket and each said arm having a slotted opening for receiving the handlebars, said slotted opening defined by parallel elongated surfaces formed in said arms, an insulated cooler having a front surface, a bottom surface, two opposing side surfaces, and a back surface;

a mounting platform secured to said back surface, said mounting platform having the configured structure for mounting engagement with said mounting structure of said mounting bracket, whereby said insulated cooler is disengageably mounted to said mounting bracket when said mounting bracket is fixedly secured to the bicycle without removal of said mounting bracket from the bicycle.

12. An insulated cooler and mounting bracket combination according to claim 11 wherein said elongated surfaces are of a length greater than the diameter of the handlebars.

13. An insulated cooler and mounting bracket combination according to claim 11 wherein said slotted opening terminates in a circular arc surface.

14. An insulated cooler and mounting bracket combination according to claim 11 wherein each of said elongated surfaces is oriented in a vertical plane when said mounting bracket is mounted onto the handlebars.

15. An insulated cooler and mounting bracket combination according to claim 11 wherein said mounting structure includes a first means defining a C-shaped slot, and wherein said configured structure includes a member carrying a second means for engagement with said slot.

16. An insulated cooler and mounting bracket combination according to claim 15 wherein said member is shaped as an extended platform.

17. The mounting bracket according to claim 15 wherein the arms are rotatable relative to said bracket and are provided with a surface for limiting upward rotation of said arms supports.

18. The mounting bracket of claim 15 further comprising reflective means for reflecting light.

19. The insulated cooler and mounting bracket of claim 15 wherein a horizontal cross-section of the mounting platform is T-shaped.

20. The insulated cooler and mounting bracket of claim 19 wherein the horizontal component of the mounting platform has dimensions which permits slidable mounting within said retention slot of the mounting bracket and the vertical component of the mounting platform has dimensions which permit its insertion into the slot of the mounting bracket.

21. An insulated cooler and mounting bracket combination according to claim 11, and further comprising reflective means for reflecting light.

22. An insulated cooler and mounting bracket combination according to claim 21 wherein said reflective means comprises plastic reflectors.

23. An insulated cooler and mounting bracket combination according to claim 21 wherein said reflective means comprises of reflective tape.

24. An insulated cooler and mounting bracket combination according to claim 21 wherein said reflective means comprises plastic reflective material.

25. An insulated cooler and mounting bracket combination according to claim 21 wherein said reflective means is mounted to said side surfaces of said cooler.

26. An insulated cooler and mounting bracket combination according to claim 21 wherein said insulated cooler includes a handle; and wherein the reflective means is mounted to said handle of said cooler.

27. An insulated cooler and mounting bracket combination according to claim 21 wherein the reflective means is mounted to said side surfaces, said front surface and said handle of said cooler.

28. An improved container and mounting bracket adapted for detachable connection to a bicycle, the bicycle having a frame, a head, and handlebars, comprising:

a mounting bracket having a front side and a back side, said front side having a retention member defining a mounting groove, said back side having three molded brackets, a first arm support, a second arm support and an adjustable foot member, said arm supports and said foot member each having a proximal end and a distal end, said proximal ends of said arm supports and said foot supports being pivotally mounted to a separate one of said molded brackets, the molded brackets for said arm supports being symmetrically positioned about a vertical centerline on the back side of said mounting bracket and the molded bracket for the adjustable foot member being positioned below the arm member molded brackets and along the vertical centerline, said distal ends of said arm supports further comprising an arcuate arm extension for engagement with said handlebars and an arm extension support, said arm extension support connecting said arcuate arm extensions, said foot member having at a distal end a first head brace, the first head brace having a curved surface for making rotating sliding contact with a cylindrical bicycle head, and having at a proximal end a second head brace having a curved surface for making rotating sliding contact with a cylindrical bicycle head, said foot member being manipulable for engaging either one of said head braces against the cylindrical bicycle head; and a container, having a front surface, a back surface and two opposing side surfaces, a top and a bottom, said back surface having a mounting platform, said mounting platform engageable with said mounting groove of said mounting bracket.

29. The mounting bracket of claim 28 wherein said first head brace and said second head brace are each provided with a slot for accommodating a bicycle hand brake cable.

30. A mounting bracket according to claim 28 wherein said distal end of said adjustable foot member further comprises a threaded adjustment means attached to said proximal end, and wherein said first head brace is threadedly attached to said threaded adjustment means, said proximal end being pivotally attached to one of said molded brackets so that the distal end may be pivoted for locating said first head brace in a position between said arm supports when the same are pivoted tight against said back side.

31. The mounting bracket of claim 30 wherein said first head brace and said second head brace are each provided with a pair of holes on opposite sides of said curved surface for engagement with a security strap for biasing said head brace against the head of the bicycle frame.

* * * * *